United States Patent
Guest

(10) Patent No.: US 6,863,314 B2
(45) Date of Patent: Mar. 8, 2005

(54) APPARATUS RELATING TO TUBE COUPLINGS

(75) Inventor: John Derek Guest, Maidenhead (GB)

(73) Assignee: John Guest International Limited, Middlesex (GB)

( * ) Notice: Subject to any disclaimer, the term of this patent is extended or adjusted under 35 U.S.C. 154(b) by 0 days.

(21) Appl. No.: 09/850,866

(22) Filed: May 8, 2001

(65) Prior Publication Data

US 2001/0054819 A1 Dec. 27, 2001

(30) Foreign Application Priority Data

May 10, 2000 (GB) .............................................. 0011317

(51) Int. Cl.$^7$ ................................................ F16L 35/00
(52) U.S. Cl. ........................... 285/81; 285/87; 285/308; 285/319; 285/322
(58) Field of Search ........................... 285/81, 87, 308, 285/319, 322

(56) References Cited

U.S. PATENT DOCUMENTS

| | | | | |
|---|---|---|---|---|
| 742,655 | A | * 10/1903 | Homola | 285/81 |
| 996,079 | A | * 6/1911 | Greenlund | 285/81 |
| 3,858,915 | A | * 1/1975 | De Vincent et al. | 285/81 |
| 4,648,630 | A | * 3/1987 | Bruch | 285/87 |
| 5,251,940 | A | * 10/1993 | DeMoss et al. | 285/87 |
| 5,344,194 | A | * 9/1994 | Hatagishi et al. | 285/308 |
| 5,395,140 | A |   3/1995 | Wiethorn | |
| 5,401,063 | A | * 3/1995 | Plosz | 285/81 |
| 5,443,289 | A |   8/1995 | Guest | |
| 5,607,193 | A |   3/1997 | Guest | |
| 5,628,531 | A |   5/1997 | Rosenberg et al. | |
| 5,649,724 | A |   7/1997 | Wiethorn | |
| 5,658,020 | A | * 8/1997 | Carman et al. | 285/81 |
| 5,779,279 | A | * 7/1998 | Bartholomew | 285/81 |
| 5,915,738 | A |   6/1999 | Guest | |
| 5,931,509 | A |   8/1999 | Bartholomew | |
| 5,934,713 | A |   8/1999 | Guest | |
| 5,988,693 | A | * 11/1999 | Street | 285/87 |
| 6,082,779 | A | * 7/2000 | Lesser et al. | 285/319 |
| 6,290,264 | B1 | * 9/2001 | Inoue | 285/87 |

FOREIGN PATENT DOCUMENTS

| | | |
|---|---|---|
| EP | 0 756 125 A1 | 1/1997 |
| EP | 0 829 671 A2 | 3/1998 |

OTHER PUBLICATIONS

European Patent Office Search Report dated Nov. 29, 2002.
European Patent Office Communication pursuant to Article 92(2) EPC dated Jul. 30, 2003.

* cited by examiner

Primary Examiner—James M. Hewitt
(74) Attorney, Agent, or Firm—Baker & Daniels

(57) ABSTRACT

A coupling for a tube having a coupling body with a throughway open at one end to receive an end portion of a tube, a sealing ring or rings mounted in the coupling body at a location spaced from said open end thereof to engage and seal with the outer periphery of the tube, and a tube latching device for locking a tube in the coupling body. The latching device comprises a first latch within the coupling body to engage automatically with a feature on the tube when the tube end portion has been inserted sufficiently into the throughway to engage with the seals to retain the tube end portion in the coupling body and a second manually operable latch disposed externally of the coupling body engageable with a feature on the tube when the end portion of the tube has been inserted into the coupling body sufficient for the first latch to engage to provide a secondary retention for the tube in the coupling body.

21 Claims, 10 Drawing Sheets

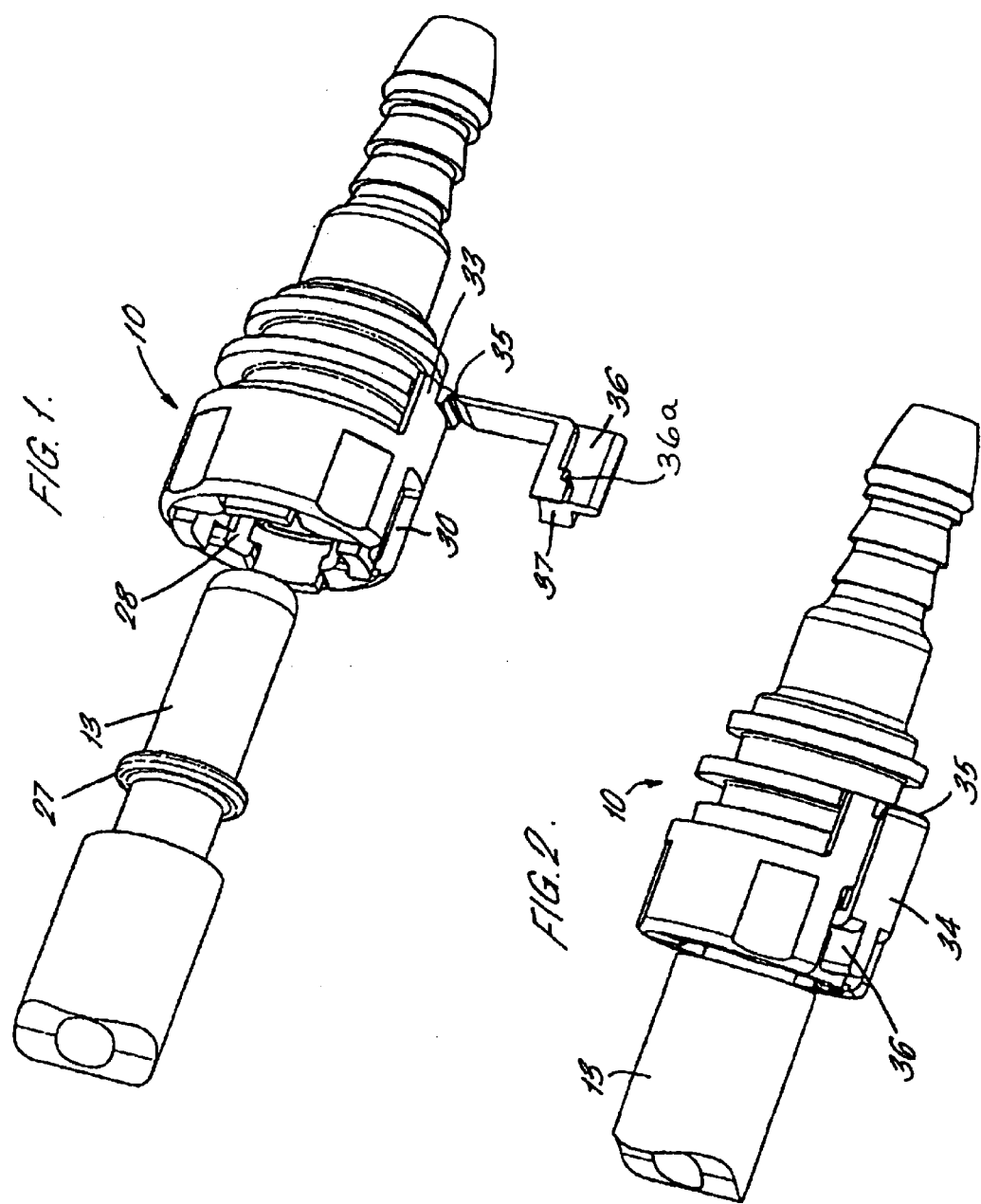

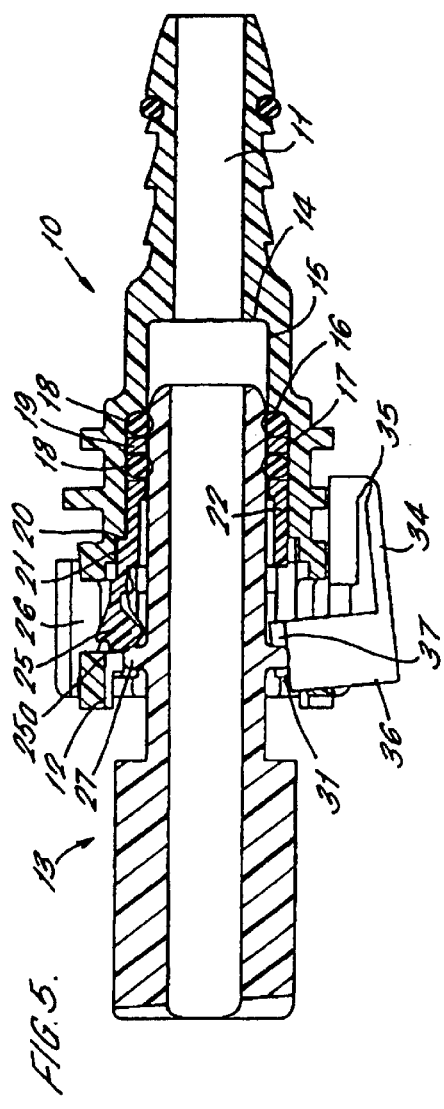
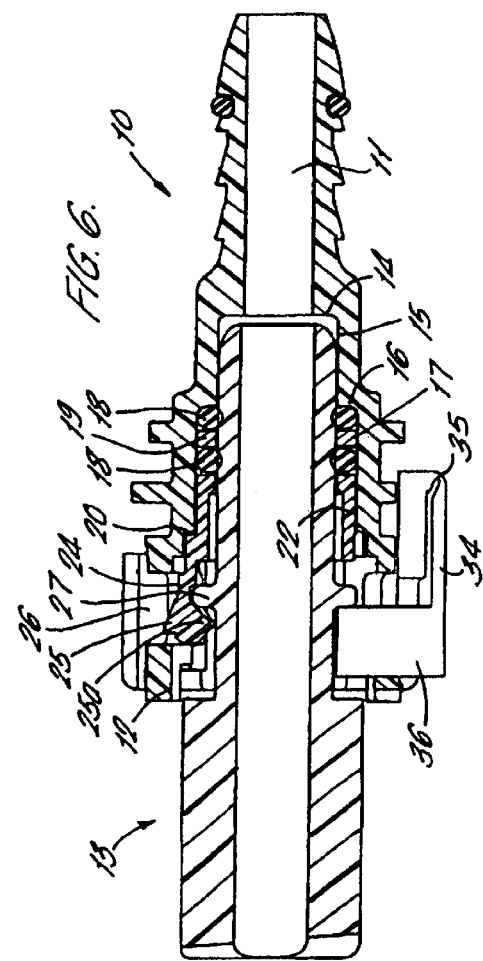

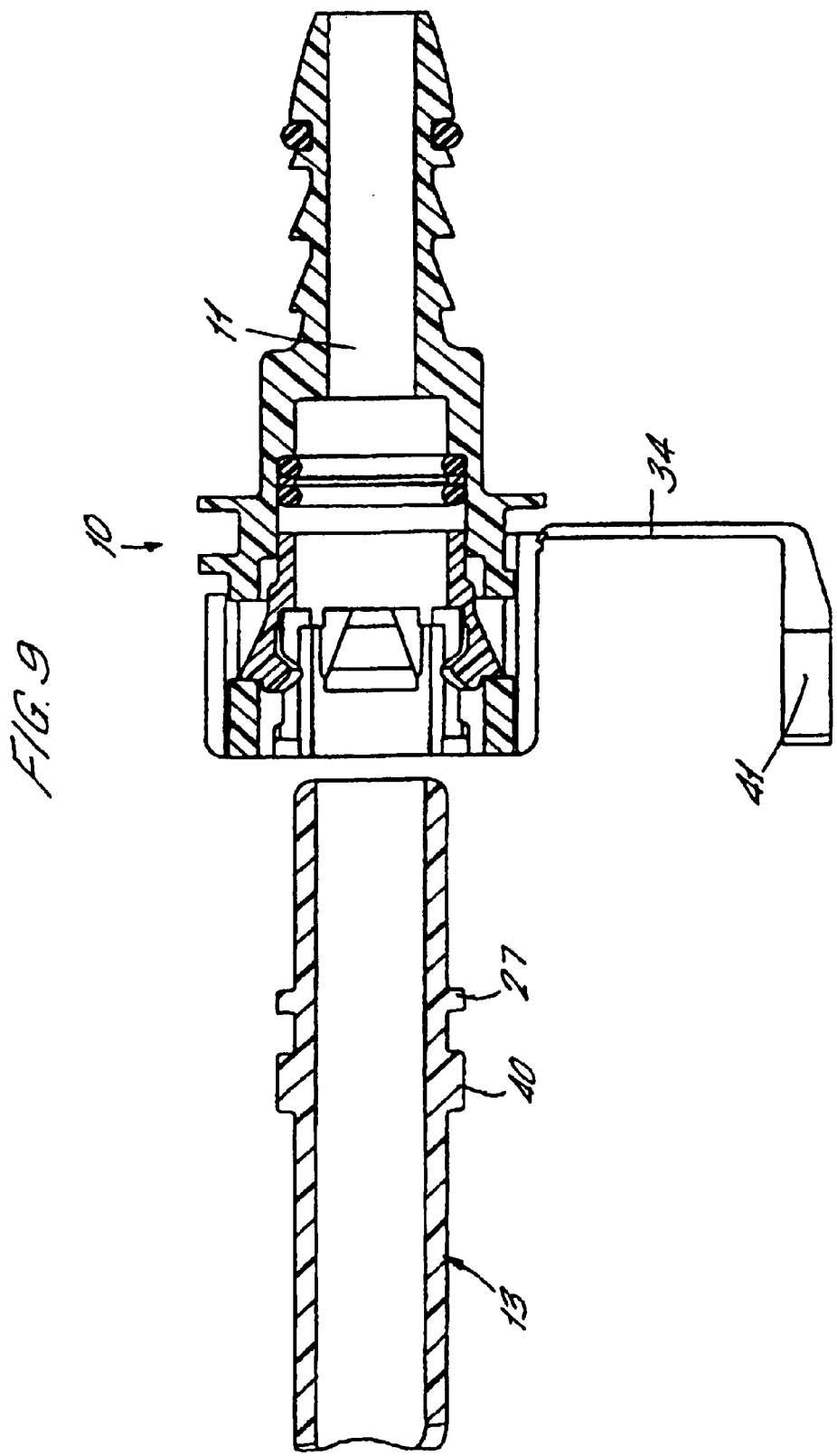

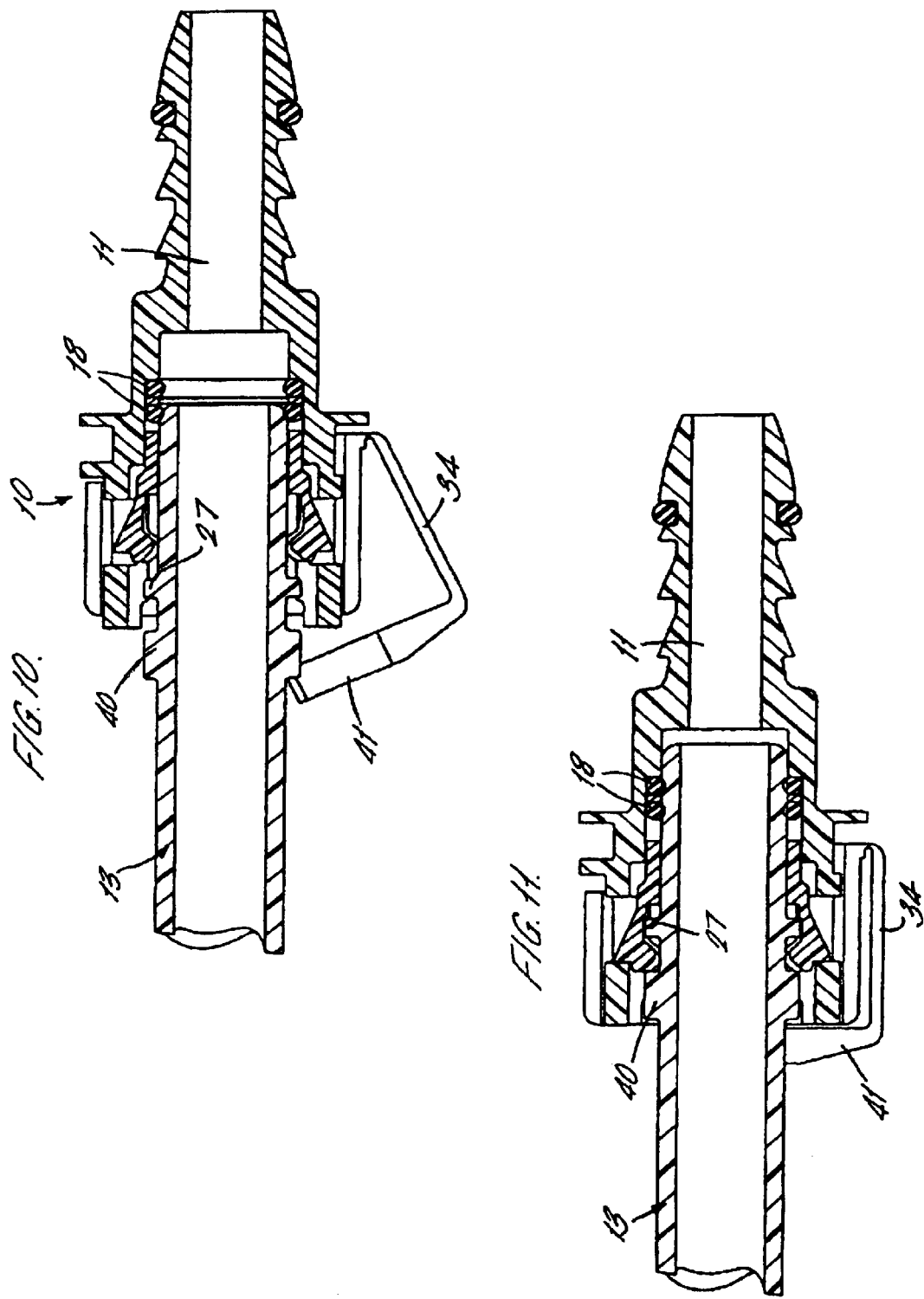

APPARATUS RELATING TO TUBE COUPLINGS

BACKGROUND OF THE INVENTION

1. Field of the Invention

This invention relates to couplings for receiving tubes or stuffer pins or the like such as disclosed in EP-A-00300504.8 and EP-A-756125.

2. Background Prior Art

Our European patent publication no. 0829671, published on Mar. 18, 1998, and corresponding to U.S. Pat. No. 5,934,713, describes and illustrates a number of connectors for latching engagement with tubes or stuffer pins in which a tube must be pressed into the connector body sufficiently to engage a seal located in the body for the latching arrangement provided to operate and retain the tube in the body. Typically, a raised bead is provided on the tube with which the latch in the coupling body engages.

A number of users of such devices have requested that secondary latches be fitted to the connectors in certain applications such as in tube connectors used in motor vehicle engine compartments. For example, one user has a requirement that a secondary latch is engaged in a separate manual operation from the primary assembly operation of inserting a tube in the coupling body and that the secondary latch only operates properly if the tube has been inserted so the primary latch within the coupling body is successfully engaged.

It is an object of this invention to meet these additional requirements.

SUMMARY OF THE INVENTION

This invention provides a coupling for a tube or the like comprising a coupling body having a throughway open at one end to receive an end portion of a tube, sealing means mounted in the coupling body at a location spaced from said open end thereof to engage and seal with the outer periphery of the tube, and a tube latching device comprising first latching means disposed within the coupling body having at least one latch to engage automatically with a feature on the tube when the tube end portion has been inserted sufficiently into the throughway to engage with the sealing means to retain the tube end portion in the coupling body and second manually operable latching means disposed externally of the coupling body having a latch engageable with a feature on the tube when the end portion of the tube has been inserted into the coupling body sufficient for the first latch to engage to provide a secondary retention for the tube in the coupling body.

BRIEF DESCRIPTION OF THE DRAWINGS

The following is a description of some specific embodiments of the invention, reference being made to the accompanying drawings in which:

FIG. 1 is a perspective view of a connector and tube end to be located in the connector with a secondary external latch in the released position;

FIG. 2 is a perspective view of a connector of FIG. 1 showing the tube end engaged in the connector and the secondary latch in its closed position;

FIG. 5 is a cross-sectional view of the coupling with the tube end partially inserted and the secondary latch engaged as shown in FIG. 2;

FIG. 6 is a cross-sectional view of the coupling with the tube end fully inserted and the secondary latch engaged as shown in FIG. 2;

FIG. 9 is a cross-sectional view through the connector and tube end of FIG. 7;

FIG. 10 is a cross-sectional view of the connector as shown in FIG. 9 with the tube end partially inserted in the coupling;

FIG. 11 is a further view of the connector of FIG. 9 with the tube end fully inserted in the coupling and the secondary external latch closed;

DESCRIPTION OF THE PREFERRED EMBODIMENTS

Figure 3:
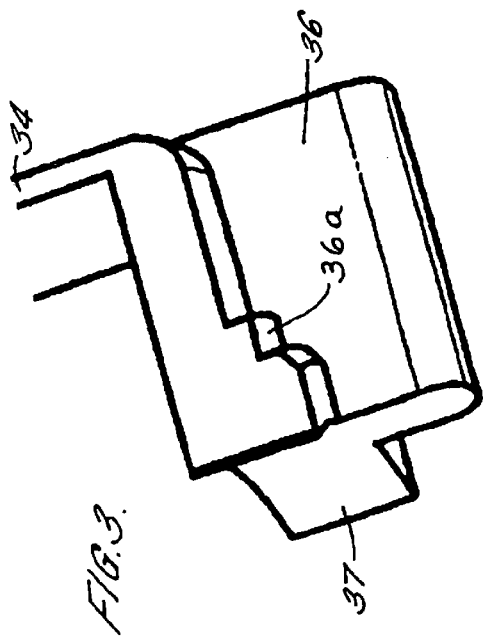
FIG. 3 is a detailed view of a portion of the secondary latch of FIG. 1.
Figure 4:
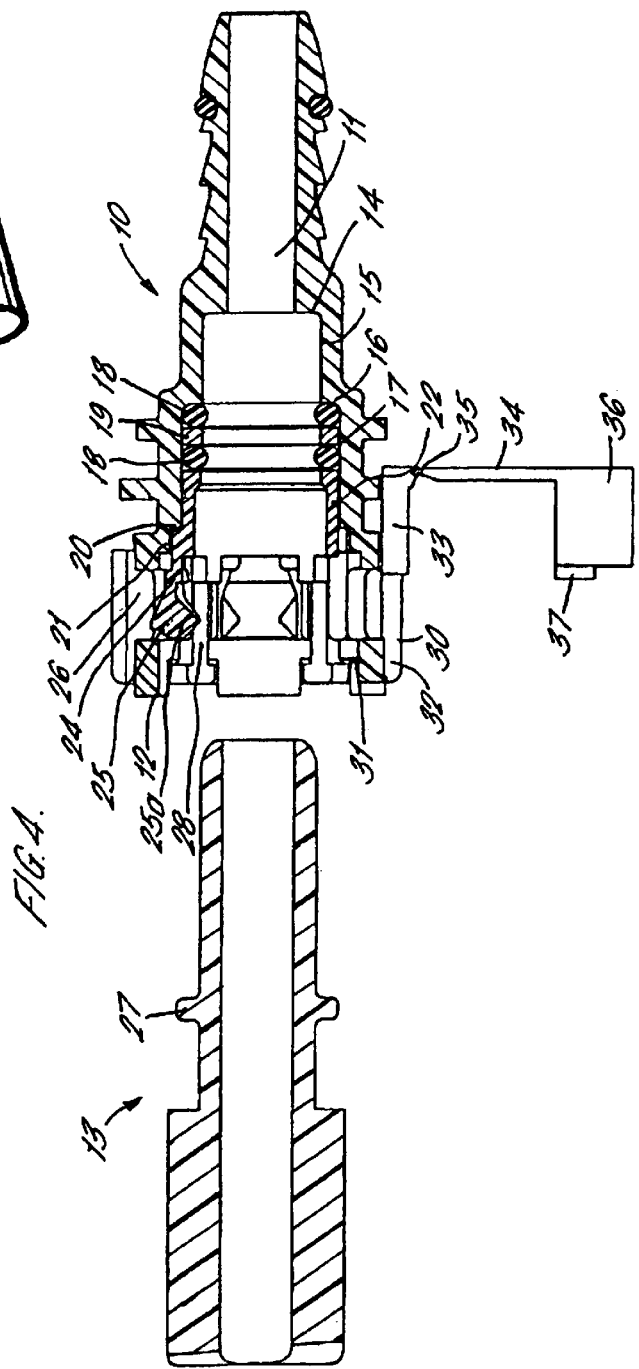
FIG. 4 is a cross-sectional view of the connector and tube end as shown in FIG. 1.

Referring firstly to FIGS. 1 to 6 of the drawings, there is shown a modified form of the tube coupling described as illustrated in our European patent publication No. 0829671 and in particular FIGS. 9 and 10 of that specification to which reference should be made. The coupling comprises a coupling body 10 having a stepped throughway 11 open at one end 12 of the coupling body to receive a tube end fitting indicated at 13. The tube end fitting in this case is a standard male end form to SAE (Society of Automotive Engineers) J2044. Other similar fittings are equally applicable. The throughway 11 is stepped at 14 to an elongated diameter portion 15 to receive the tube end 13 with a close or interference fit. The throughway is stepped at 16 to a second enlarged diameter portion 17 in which a pair of O-ring seals 18 are located with a spacer 19 between them to seal on the outside of the tube end 13. The throughway has a further step 20 to an enlarged diameter portion 21 which extends through to the open end of the throughway at 12.

The latching structure comprises a mounting element having a first position which extends into the coupling body 10 and a second position which extends over the coupling body 10. A first internal latch is located within the coupling body 10 and comprises a sleeve 22 extending through the enlarged diameter portion 21 of the throughway 11 and having a reduced diameter end portion to engage in portion 17 of the throughway. The sleeve has three integral resilient legs 24 disposed over three quarters of the circumference of the sleeve and projecting towards the open end of the coupling. The legs have latch members 25 at their distal end which have outwardly extending abutments which engage in radial openings 26 through the wall of the coupling body and have inwardly projecting teeth 25a to engage a raised annular abutment or bead 27 on the tube end. Reference should be made to our European patent publication no. 0829671 for a more detailed description of the form of the latch members and the manner of their engagement with the raised abutment on the tube end and in the openings 26 of the coupling body wall to retain the tube end in the coupling.

The sleeve 22 has integral struts 28 projecting between the teeth to the open end of the coupling body. The struts are formed integrally with a second position of a mounting element or end cap 30 encircling the end of the coupling body and which is adjustable axially on the coupling body to adjust the position of the internal latches for release of a tube end from the coupling body as described in our previous European publication.

As indicated above, the internal latches in the coupling body are provided over three quarters of the circumference of the sleeve. The remaining quarter of the sleeve is disposed opposite a slot 31 formed with the wall of the coupling body and a corresponding slot 32 formed in the wall of the cap. The wall of the cap has an extension 33 in alignment with the slot 32 and a leg 34 is attached to the extension by an integral hinge 35. The leg has a detent 36 at its distal end shaped to extend through the slots in the cap and coupling body and to engage the end of the tube behind the raised rib 27 to provide a secondary, external latch for holding the tube in place in the coupling body. The end of the detent 36 is radiused as shown at 37 with a corresponding radius to the tube end to provide a close engagement between the abutment and tube. The detent is formed with abutments 36a which snap behind abutments on either side of the slot in the coupling body to retain the detent in the engaged position. In the addition, the hinge 35 between the leg 34 and cap extension 33 has a moulded characteristic such that the leg 34 snaps towards the coupling body when adjacent the body and snaps outwardly of the body when withdrawn beyond an intermediate position in its travel, i.e., the hinge 35 also functions as an integral spring or integral spring means in the illustrated embodiment. The leg then stands outwardly of the coupling body and provides a clear visual or tactile indication that it is not engaged.

Figure 7:
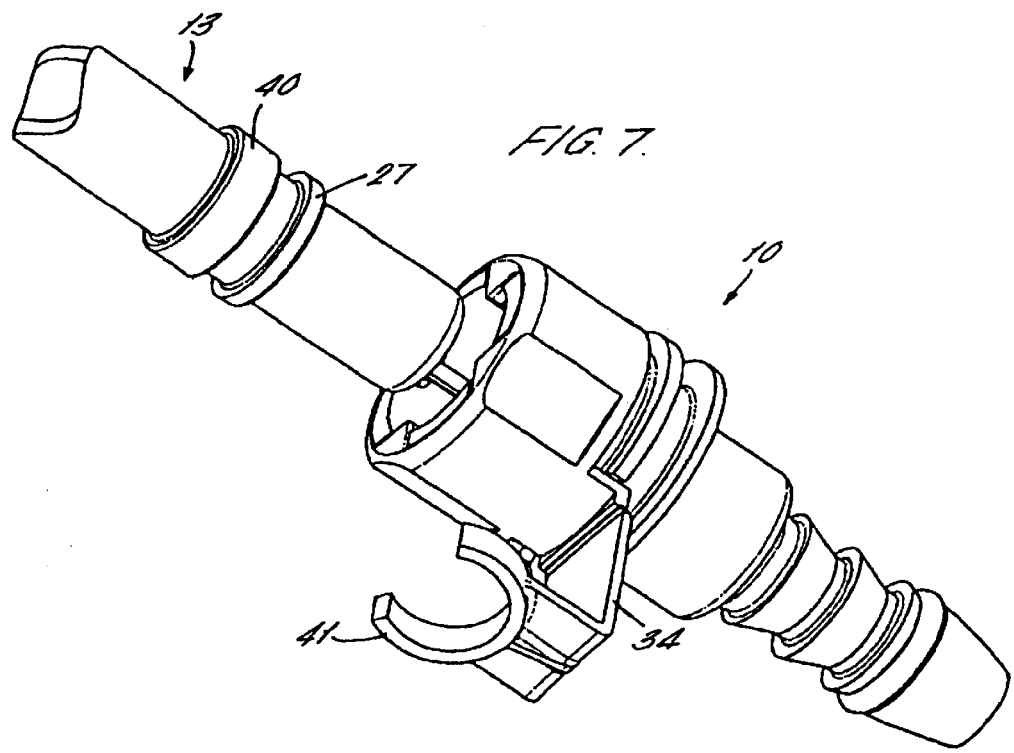
FIG. 7 is a perspective view of an alternative form of coupling and tube end with the tube end in alignment with the connector and an external, secondary latch on the coupling in the released position.
Figure 8:
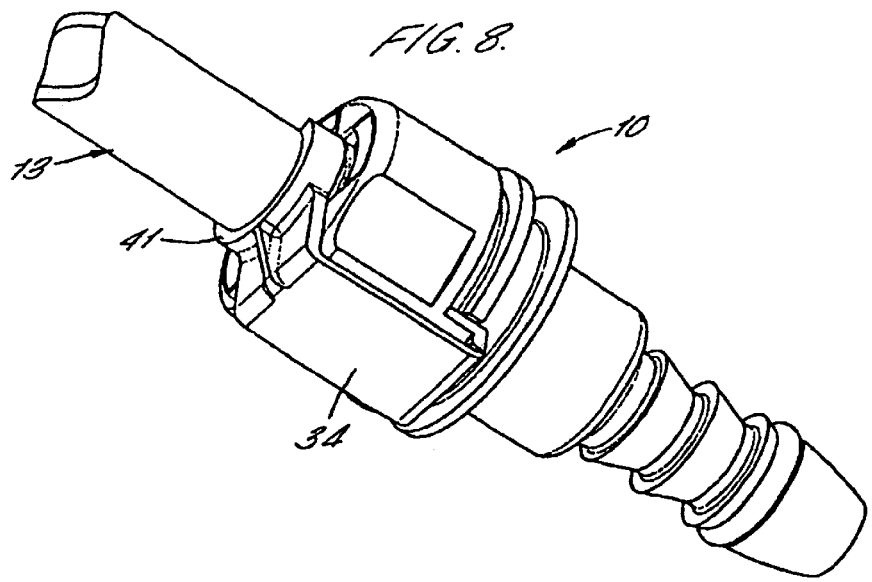
FIG. 8 is a perspective view of the coupling of FIG. 7 showing the tube end fully engaged in the coupling and the second external latch in the closed position.

FIGS. 7 to 11 show a broadly similar arrangement except that in this case the tube end 13 has a second raised bead 40 beyond the first bead or abutment 27 and the detent 36 on the leg 34 is arranged to project beyond body in the closed position and to engage the tube end 13 beyond the second bead 40. Thus in this arrangement the tube abutment 27 does not fit between slots in the cap and coupling body so the coupling body may be provided with four internal latches to engage the bead 27 rather than three as the shown in the embodiment of FIG. 1–6. Also the detent is in the form of a C-shaped clip 41 which is a snap fit on the tube end. The arrangement is otherwise much the same as that of FIG. 1.

The arrangement of FIGS. 1 to 6 can also be adapted to have four latch members 25 within the coupling body and one pair of members spaced sufficiently to accommodate the external manual latch between them.

Figure 12:
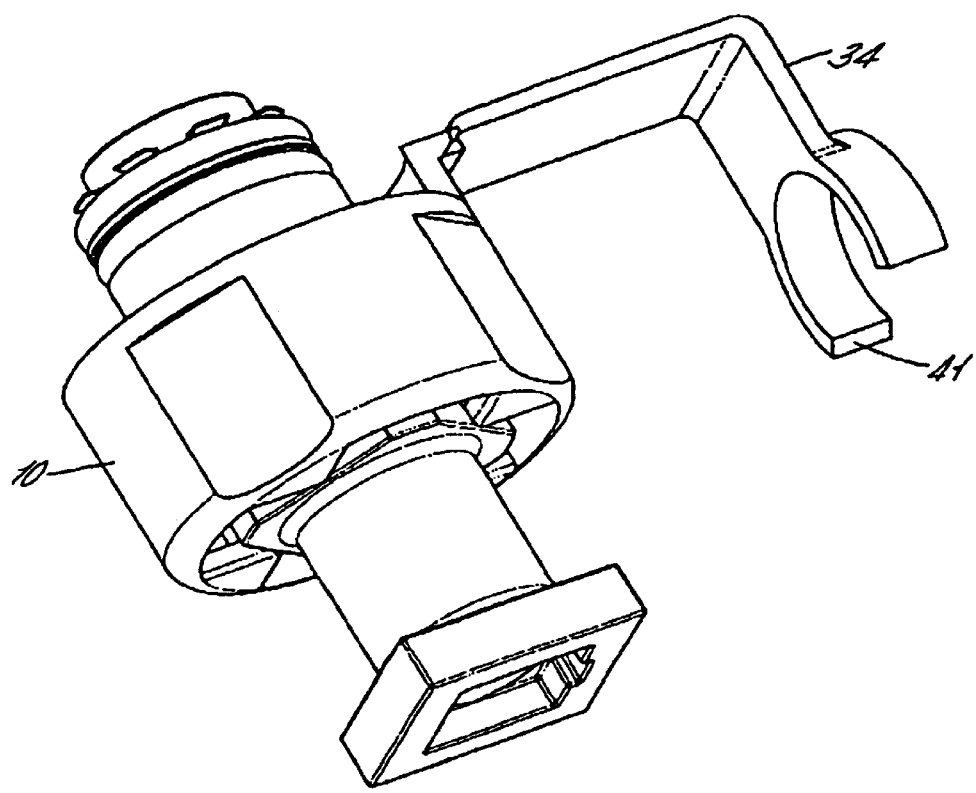
FIGS. 12 and 13 and 14 and 15 show perspective and cross-sectional views of further connector arrangements with the stuffer pins rather than the tube ends.
Figure 13:
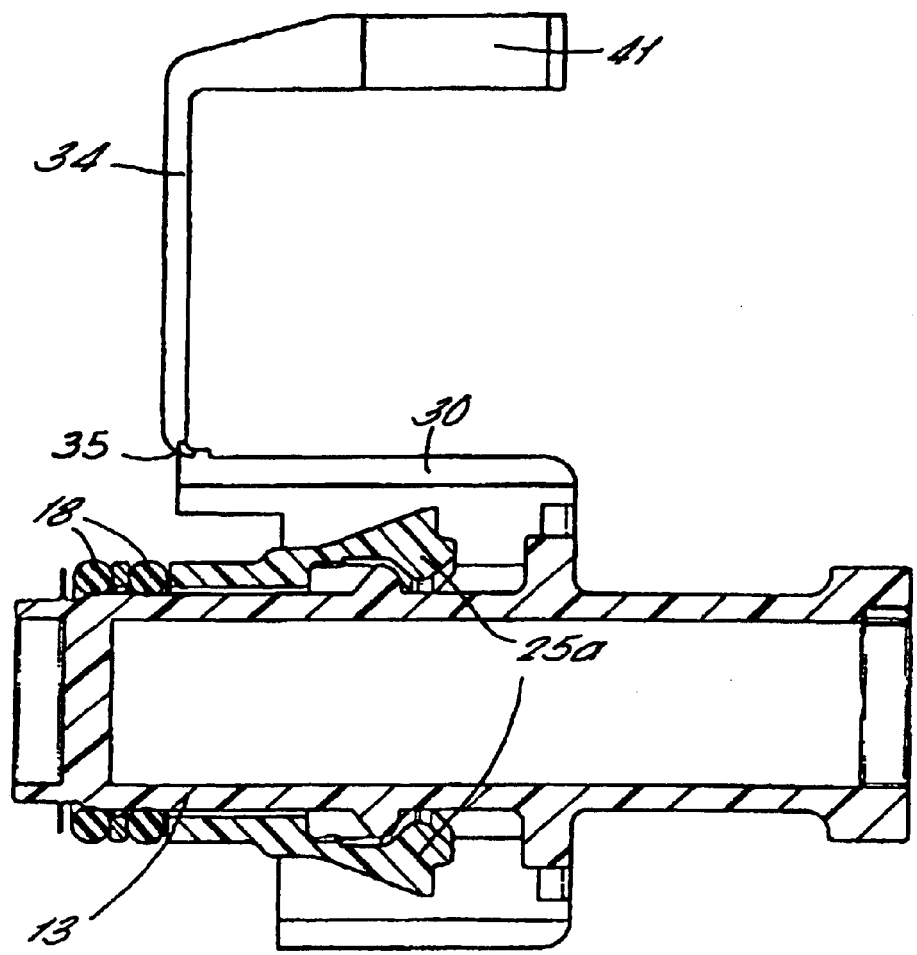
Figure 14:
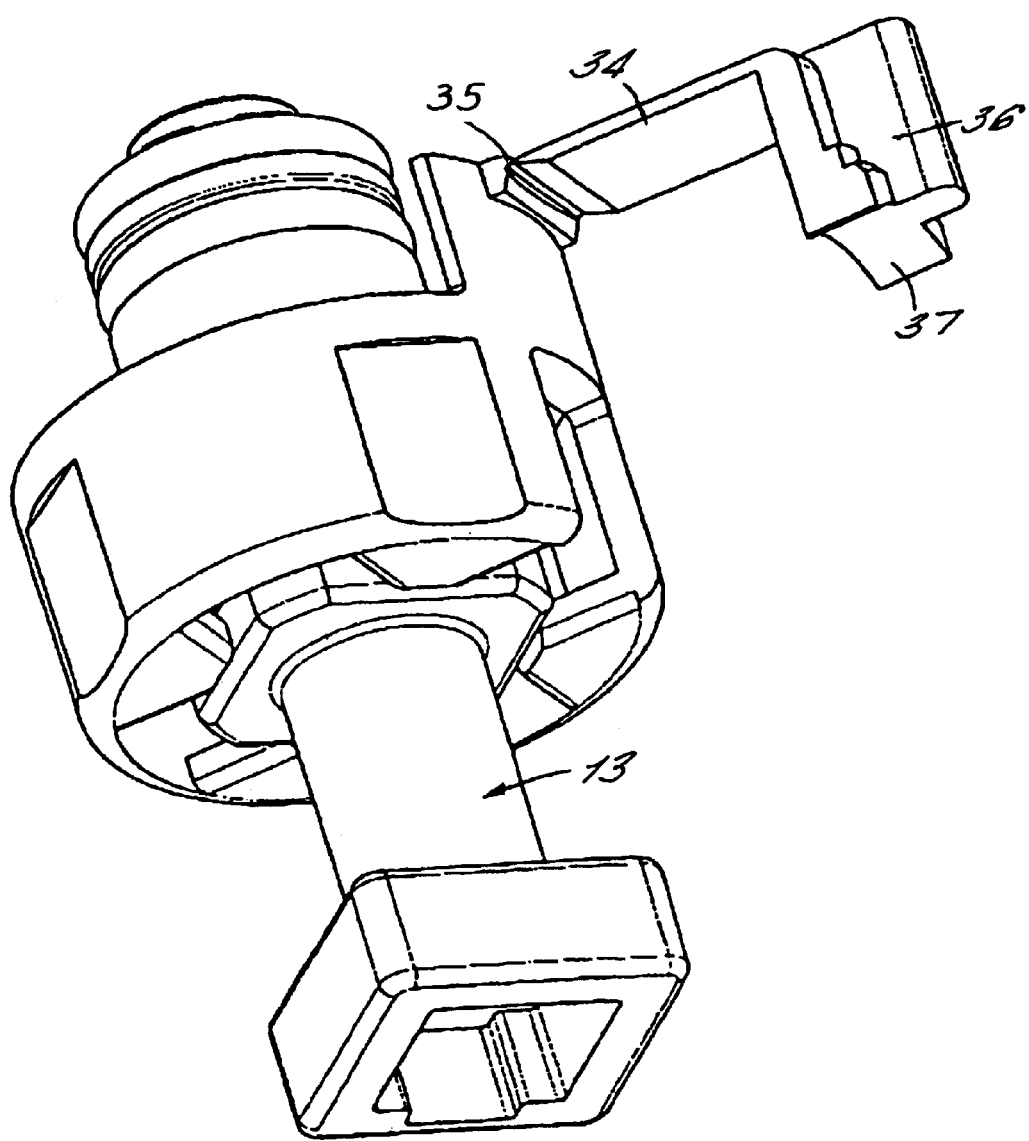
Figure 15:
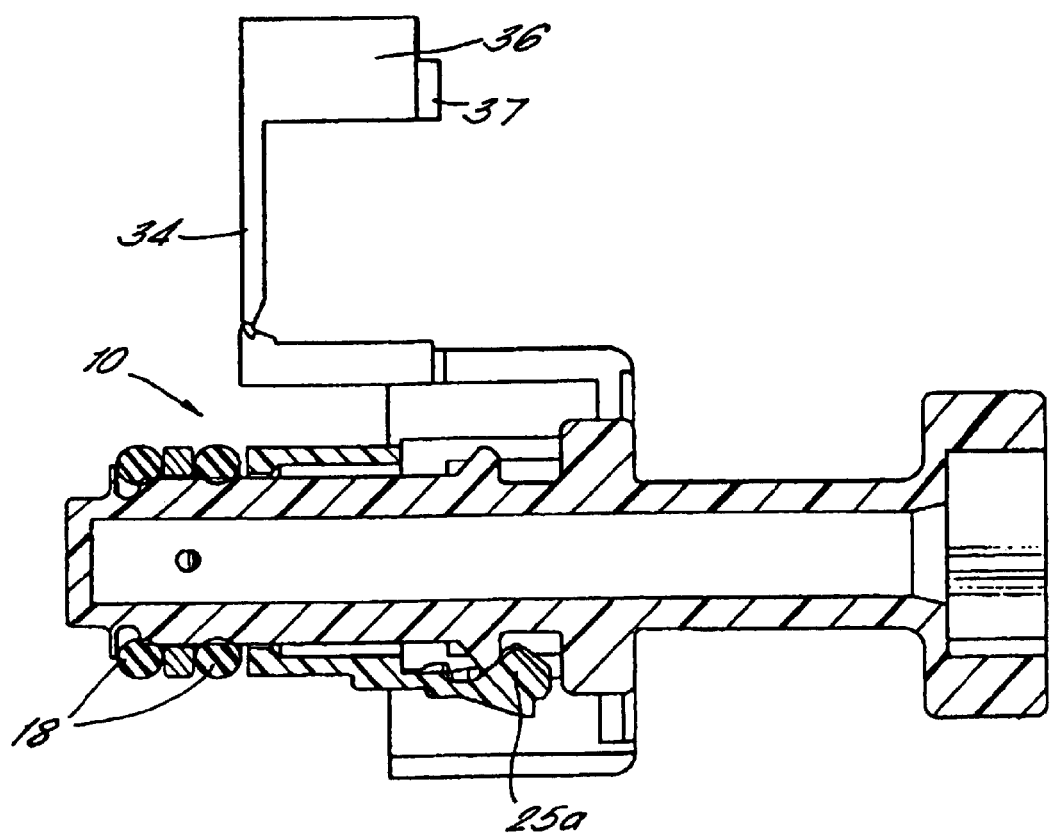

FIGS. 12 to 15 shows similar arrangements applied to stuffer pins rather than tube ends.

What is claimed:

1. A coupling for a tube having a feature spaced from an end of the tube for engagement by latching devices, the coupling comprising a coupling body having a throughway open at one end to receive an end portion of the tube;

a seal mounted in the coupling body at a location spaced from said open end thereof to engage and seal with the outer periphery of the tube;

a first latching device disposed within the coupling body having at least one latch to engage automatically with the feature on the tube when the tube has been inserted sufficiently into the throughway to engage with the seal to thereby retain the tube in the coupling body and a second manually operable latching device disposed externally of the coupling body and manually moveably mounted on the coupling body between one position in which the second latching device is engageable with the feature on the tube when the tube has been inserted into the coupling body sufficient for the first latching device to engage and provide a second independent retention for the tube in the coupling body when the tube is engaged by said first latching device, and another position withdrawn from the tube to allow release of the tube from the coupling body and wherein the second latching device includes a hinged leg having an integral spring to bias the second latching device toward the position withdrawn from the tube when the second latching device is disengaged; and mounting means having a first portion extending into the coupling body and on which the first latching device is mounted and a second portion extending over an external surface of the coupling body and on which the second latching device is mounted.

2. A coupling as claimed in claim 1, wherein the second portion of the mounting means comprises an end cap on which the second latching device is mounted, the end cap encircling the open end of the coupling body and having an opening in an end of the cap for the tube to extend through into the coupling body, and said first portion of the mounting means comprises a sleeve carrying the first latching device, the sleeve extending from said end of the cap into the coupling body.

3. A coupling as claimed in claim 2, wherein the leg is hinged to the cap and has a detent at a distal end of the leg to engage said feature on the tube located within the coupling body to retain the tube in the coupling body.

4. A coupling as claimed in claim 3, wherein the cap and coupling body have slots through which the second latching device can project to engage said feature on the tube, said feature also engaged by said first latching device within the coupling body to thereby retain the tube within the body.

5. A coupling body as claimed in claim 4, wherein an interengaging abutment is provided on the detent and coupling body to retain the detent engaged in said slots.

6. A coupling as claimed in claim 4 wherein the integral spring biases the leg outwardly of the cap when the detent is not engaged with said feature on the tube.

7. A coupling as claimed in claim 6, wherein the leg has an inner position in which the second latching device is engaged in the coupling body and an outer position in which the second latching device is disengaged from the coupling body, and said integral spring biases the leg outwardly when the leg is in the outer position and inwardly when the leg is in its inner position.

8. A coupling as claimed in claim 2, wherein the leg is hingedly mounted to the cap and when the tube is inserted into the coupling body the second latching device is arranged to engage a second feature on the tube which is located externally of the coupling body to thereby retain the tube in the coupling body.

9. A coupling as claimed in claim 8, wherein the second latching device further comprises a C-shaped clip to snap around the tube.

10. A coupling as claimed in claim 9, wherein the integral spring biases the second latching device outwardly of the cap when the C-shaped clip is not engaged with the tube.

11. The coupling as claimed in claim 1 wherein the second portion of the mounting means comprises an end cap, said end cap having an opening in an end thereof for the tube to extend through into the coupling body, said second latching device comprising a latch disposed on said hinged leg, said hinged leg hingedly disposed on said end cap and adapted to move said latch between said first and second positions.

12. A coupling for a tube comprising a coupling body having a throughway open at one end to receive an end portion of the tube;
   a seal mounted in the coupling body at a location spaced from said open end thereof to engage and seal with the outer periphery of the tube; and
   a tube latching device comprising a first latching structure disposed within the coupling body having at least one latch to engage automatically with a feature on the tube when the tube end portion has been inserted sufficiently into the throughway to engage with the seal to thereby retain the tube end portion in the coupling body and a second manually operable latching structure disposed externally of the coupling body and having a second latch engageable with the feature on the tube when the end portion of the tube has been inserted into the coupling body sufficient for the first latching structure to engage to thereby provide a secondary retention for the tube in the coupling body;
   said latching device including a mounting element having a first portion extending into the coupling body and on which the first latching structure is mounted and a second portion extending over an external surface of the coupling body and on which the second latching structure is mounted; the second portion of the mounting element comprising an end cap on which the second latching structure is mounted, the end cap encircling the open end of the coupling body and having an opening in an end of the cap for the tube to extend through into the coupling body, and said first portion of the mounting element comprising a sleeve carrying the first latching structure, the sleeve extending from said end of the cap into the coupling body.

13. A coupling as claimed in claim 12, wherein the second latching structure comprises a leg hinged to the cap and has a detent at a distal end of the leg to engage said feature on the tube located within the coupling body to retain the tube in the coupling body.

14. A coupling as claimed in claim 13, wherein the cap and coupling body have slots through which the second latching structure can project to engage said feature on the tube, said feature also engaged by said at least one latch to thereby retain the tube within the coupling body.

15. A coupling body as claimed in claim 14, wherein an interengaging abutment is provided on the detent and coupling body to retain the detent engaged in said slots.

16. A coupling as claimed in claim 14, wherein the hinged leg includes an integral spring to bias the leg outwardly of the cap when the second latching structure does not engage said feature on the tube.

17. A coupling as claimed in claim 16, wherein the leg has an inner position in which the second latching structure is engaged in the coupling body and an outer position in which the second latching structure is disengaged from the coupling body, and said integral spring biases the leg outwardly when the leg is in the outer position and inwardly when the leg is in its inner position.

18. A coupling as claimed in claim 12, wherein, when the tube is inserted into the coupling body, the second latching structure is arranged to engage a second feature on the tube which is located externally of the coupling body to thereby retain the tube in the coupling body.

19. A coupling as claimed in claim 18, wherein the second latching structure further comprises a C-shaped clip to snap around the tube.

20. A coupling as claimed in claim 19, wherein the second latching structure has an integral spring to bias the second latching structure outwardly of the cap when the C-shaped clip is not engaged with the tube.

21. A coupling for a tube having at least one radially outwardly projecting feature spaced from an end of the tube for engagement by latching devices, the coupling comprising a coupling body having an axially extending throughway open at one end to receive an end portion of the tube;
   a seal mounted in the coupling body at a location spaced from said open end thereof to engage and seal with the outer periphery of the tube;
   a first latching device disposed within the coupling body having at least one radially inwardly projecting latch engageably positionable axially adjacent the at least one radially outwardly projecting feature when the tube has been inserted sufficiently into the throughway to engage with the seal to thereby retain the tube in the coupling body and a second latching device having a radially inwardly projecting distal end, said second latching device mounted on the coupling body and manually moveable between one position in which the second latching device is engageably positionable axially adjacent the at least one radially outwardly projecting feature when the tube has been inserted into the coupling body sufficient for the first latching device to engage and provide a second independent retention for the tube in the coupling body when the tube is engaged by said first latching device, and another position withdrawn from the tube to allow release of the tube from the coupling body and wherein said coupling body defines a slot extending through said coupling body, said second latching device being insertable through said slot to engage the tube and wherein the at least one feature is an annular abutment on the tube and said first and second latching devices are both engageable with the annular abutment; and
   mounting means having a first portion extending into the coupling body and on which the first latching device is mounted and a second portion extending over an external surface of the coupling body and on which the second latching device is mounted.

* * * * *